Jan. 5, 1937.   I. MORIOKA   2,066,996
PROCESS FOR MANUFACTURING STATUES SIMILAR TO OBJECTS
Filed Nov. 30, 1934   3 Sheets-Sheet 3
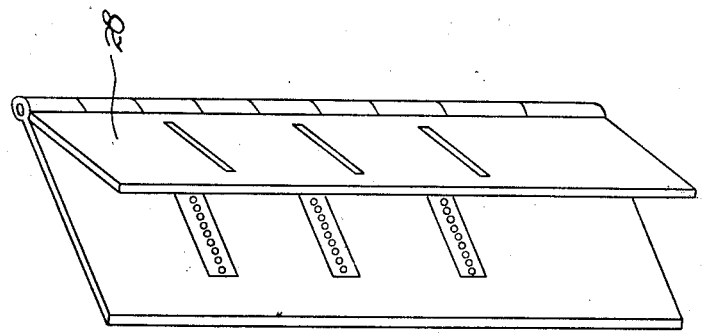
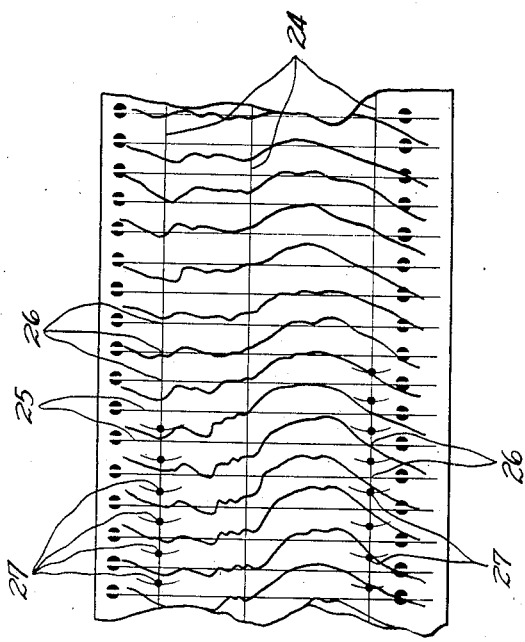
INVENTOR.
I. Morioka
BY
Glascock Downing Seebold
ATTORNEYS.

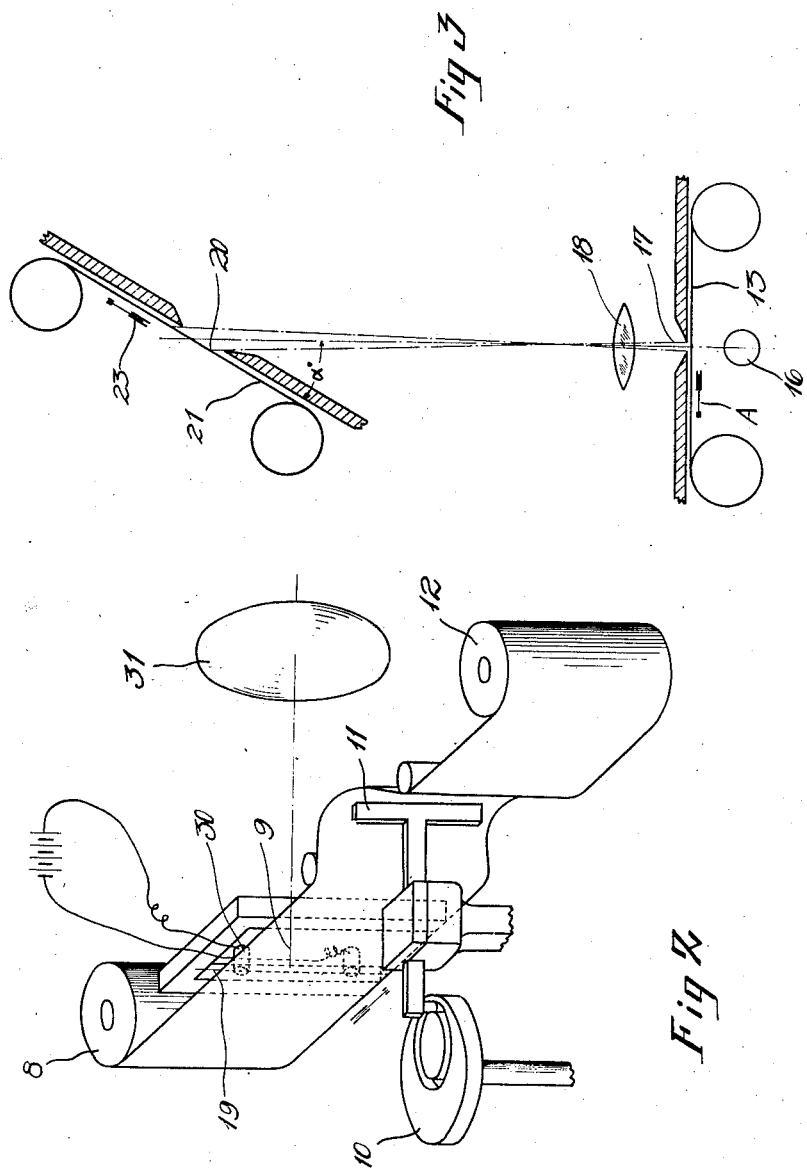

Patented Jan. 5, 1937

2,066,996

UNITED STATES PATENT OFFICE 2,066,996

PROCESS FOR MANUFACTURING STATUES SIMILAR TO OBJECTS

Isao Morioka, Meguro-ku, Tokyo, Japan

Application November 30, 1934, Serial No. 755,469
In Japan December 15, 1933

6 Claims. (Cl. 41—25)

This invention relates to an improvement in the manufacture of statues very similar to objects and the novel features of the process consist in the following steps in the sequence set forth hereinafter.

This invention constitutes an improvement on the method disclosed by U. S. Patent No. 1,719,483, invented by the present applicant, and consists mainly in the combination of effective and novel steps and processes whereby the method of the patent may be carried out most easily and exactly.

We have the first step of photographing, under the same conditions by a camera, many curves on the surface of an object which sits or stands on a rotating disc moving smoothly and having a vertical line as the rotating axis of the disc; the curves being produced by the image of an incandescent, straight, linear filament of electric light which has been projected in the direction of the rotating axis of the disc. Whenever each curve on the surface of the object is photographed, the position of the rotating axis referring to the same curve is impressed to the film at the same time; the axis of the lens of the camera being set at an acute angle α° against the plane decided by the above-mentioned projected light at the rotating axis of the disc and the camera revolving in connection with rotation of the disc periodically.

We have the second step of enlarging or contracting the negative to the required ratio on positive paper for the purpose of taking analogous curves to those on the surface of the object by the photographical method of changing the proportion of length to breadth of a photograph, referring to Patent No. 1,853,072.

We have the third step of pasting the enlarged photograph, the ratio of whose length to breadth has been changed properly, to a metal or other thin plate.

We have the fourth step of drawing for making the positions of bores for binding up the pieces which will be obtained by the next step.

We have the fifth step of cutting the plate together with the positive paper into pieces along the curves.

We have the sixth step of assembling and properly binding up the thin pieces in radial form so that the axial line of the form is the rotating axis impressed on the negative and filling the spaces between the pieces with some proper material.

For the purpose of better explaining my invention I describe the same below with reference to the accompanying drawings, in which—

Figure 2 is a perspective view of the photographing means;

Figure 3 is a plan view, parts being shown in section, illustrating the enlargement means;

Figure 4 is a fragmentary view in plan illustrating the process of making the positions of openings for the purpose of assembling and binding the photographed curves; and Figure 5 is a view in perspectively showing the means for assembling and binding of the curves.

Figure 1:
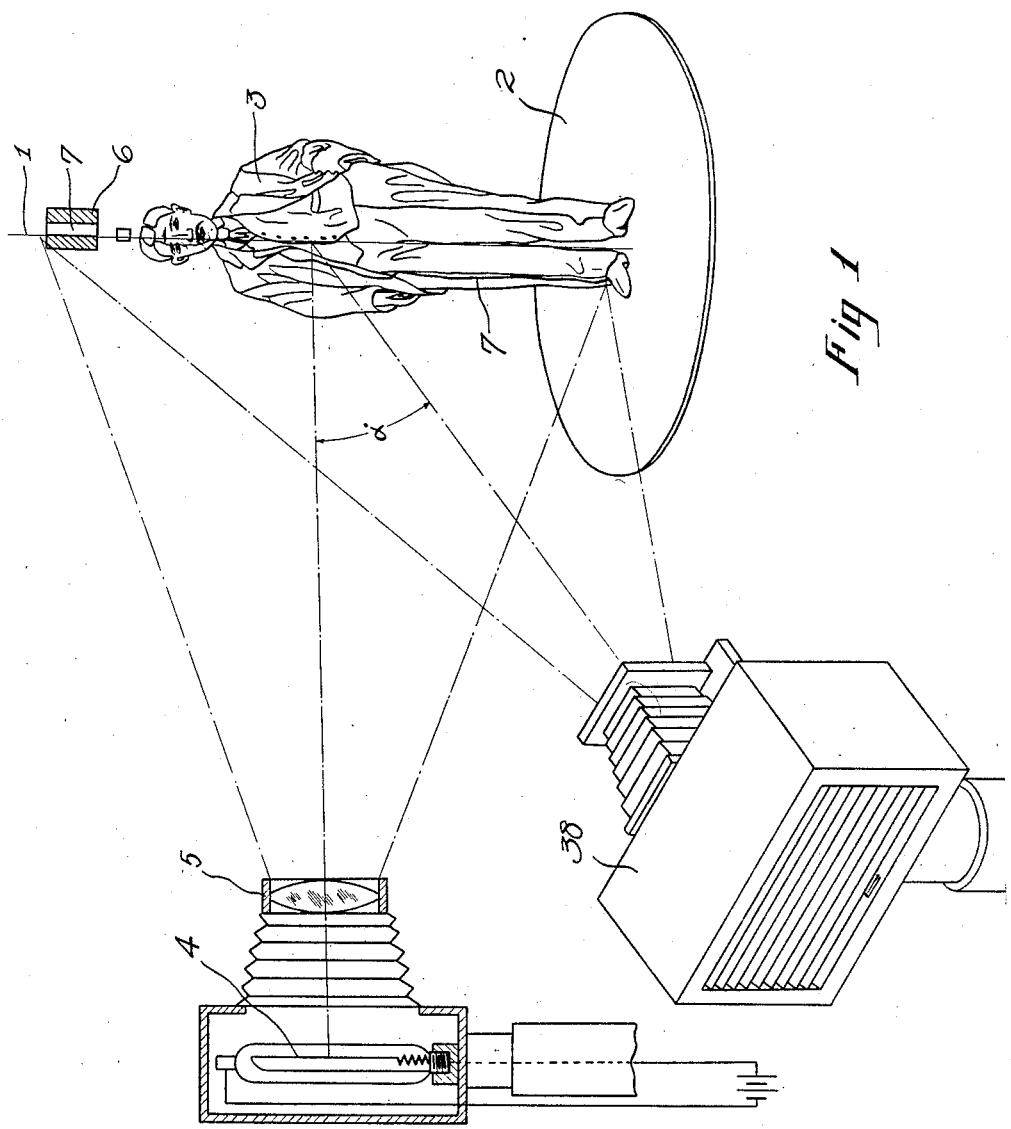
Figure 1 is a schematic view partially in perspective and partially in section of the instrumentalities utilized in the first step of the method, namely, the photographing of an object.

This invention relates to an improvement in the manufacture of statues very similar to objects of three dimensions, and consists in the undermentioned steps.

The first photographing step should be done under the conditions as follows:

Condition (1)

An object sitting or standing on a disc moving smoothly and having a vertical line as the rotating axis of the disc.

(2)

Projecting the image of an incandescent, vertical, straight, linear filament of electric light in the direction of the rotating axis of the disc.

(3)

A camera photographing, on one film, many curves on the surface of the object produced by the projected image as above.

(4)

Whenever each curve on the surface of the object is photographed, the position of the rotating axis referring to the same curve being impressed to the film at the same time.

(5)

The axis of the lens of the camera being set at an acute angle α° to the plane of the above-mentioned projected light at the rotating axis of the disc.

(6)

The camera revolving in connection with rotation of the disc periodically.

We have the second step of enlarging or contracting the negative to the required ratio on positive paper by the photographic method of changing the proportion of length to breadth of a photograph, U. S. Patent Number 1,853,072.

We have the third step of pasting the enlarged positive paper to a metal or other thin plate.

We have the fourth step of drawing for the purpose of determining the positions of bores, which should be pierced through with a few wires of concentrical circular arcs, the center of which arcs remains on the photographed points of the above-mentioned rotating axis of the disc.

We have the fifth step of cutting the thin plate together with the positive paper along the curves on the same paper.

We have the sixth step of piercing through the cut thin pieces with a few wires of circular arc at the points of bores as made above, and of inserting packings of some substantial material or other among the pieces around the openings, assembling the thin pieces in radial form, and filling up each space with gypsum, paraffin, etc. For the purpose of better explaining my invention I describe the same below with reference to the accompanying drawings in which; Figure 1, as the first step, shows the method of photographing an object. Figure 2 shows an illustration of the photographing means as one step. Figure 4 shows the process for producing the positions of bores for the purpose of assembling and binding the above-mentioned photographed curves. Figure 5 shows the means for assembling and binding the curves.

Now I explain the invention in detail with reference to the accompanying drawings.

See Fig. 1.

An object 3 sits on a stool on the rotating disc 2 or stands on it finishing one rotation in 5 or 10 seconds, its rotating axis coinciding with a perpendicular line shown by a thread with a plumb 1, and the image of an incandescent light 4 will be projected through the lens 5 to the above-mentioned perpendicular line.

About the position between the image of a projecting light and the perpendicular line there is such a relation that, when a sheet of white paper 6 is put close behind the perpendicular line, one side-line of the projecting image 7 of an electric light must coincide with the perpendicular line 1.

In this way, the strongest degree of the projecting light will always fall upon the surface of the object so as to set a side-line of the projected light within the vertical plane including the perpendicular line 1 and the light illuminates the surface of the object, causing most clear curve lines on it, on all parts of which, the form of the curves alters orderly, according to the nature of the surface of the object.

During one rotation of the disc in this photographing process a few hundred, for instance 456, curves of this clear projected image are photographed under the same conditions and it will change its form on the surface of the object while the disc is rotating. The lens-axis of the camera is set at an acute angle $\alpha°$, for example 30° to the plane of the projecting light, the rotating axis of the disc being the vortex line.

See Fig. 2.

One end of a new film 8 can pass on the photographing face 9 to a winding drum 12 which will wind it up at a constant speed smoothly, and during the passing the film is beaten forth by a beater 11 moving in connection with a cam 10 and a curve produced by the above-mentioned light must be photographed while the film is still, and then a first beating will be given to the film.

After the film in the camera has been forced to slide, the same length as that of the loosened portion will go on toward the winding drum 12, when the above-mentioned curve on the object is photographed on the film, because the film of the exposured face 9 is still, and next to this, the same length of the film as that wound up by the winding drum 12 after the first beating will be sent forth for the second beating, and during this sending-forth process, namely, while the film 8 is moving just before the exposured face 9, it will not be impressed, but the above-mentioned curve 4 on it will be impressed while the film is still, and this operation should be repeated over and over again for the purpose of finishing the photographing.

This apparatus may have a straight thin wire or, as shown, a razor blade 19 coinciding with the image of the vertical line with a plumb showing a perpendicular line on the camera face 9.

In addition, this apparatus has a means to impress every axial line of the rotating axis for each curve on the film at the same time, and by that means, more than two lustrous bodies, for example, small electric lamps 30 over the wire or framing 19 are sensitized every time when curve after curve is sensitized on the film.

Thus the above-mentioned rotating disc and the camera are connected with each other by means of the same motive force and the rotation of the disc is connected with that of the camera.

See Fig. 3.

The angle between the plane of the projecting light and the axial line of the camera lens at the rotating axis of the disc being no right angle, the curves photographed by the above-mentioned process are not similar to those which appeared on the object during the photographing.

So, for the purpose of this enlarging process, a special method is necessary as follows:

Behind the slit 17, the developed film 13 photographed by the above-mentioned means should be removed in the direction of the arrow A shown at a constant speed and, the image of a photograph on the film will be projected by light source 16 and lens 18, and behind the slit 20 bromide paper should be removed in the direction of the arrow 23 shown at the same speed and in the same direction of the said image.

In this process, the angle between the plane of the bromide paper and that of the film 13 should be complement $(90°-\alpha°)$ to the angle $(\alpha°)$ which means that angle between the plane decided by the projecting light and the axial line of the lens during the above-mentioned photographing.

By this means, if vertical length needs to be enlarged M times as long as the original length, its horizontal length on the film to be enlarged will be $$M \times \frac{1}{\sin \alpha°}$$

So, if the above-mentioned $\alpha°$ in Fig. 1 is 30°, then $\alpha°$ in Fig. 3 should also be the same.

Accordingly, if we, for instance, enlarge the length ten times as long as the original one of the image, its breadth will be $$M \times \frac{1}{\sin \alpha°} = 10 \times \frac{1}{\sin 30°} = 10 \times 2 = 20$$

that is, twenty times.

After developing the sensitized bromide enlarged by the above-mentioned enlargement process, it must be pasted to some thin plate, for instance, zinc plate, and be dried up, after which step (refer to Fig. 4) it is pinned on a base plate, and more than two parallel lines 24 should be set down in proper position on it, and after each curve puts on number on it, we draw vertical straight lines 25 passing through the shadows of a slender wire or the like 19 which were impressed on the film during the photographing process.

We render the cross points of vertical lines 25 and horizontal ones 24 the starting points and we impress a dot 27 on the part of the line 24 cut by a curve and next curve.

We produce a point 27 for each curve, the distance between each point 27 and each crossed point 26 being constant.

If any dot 27 required should fall out from the part of the line between adjacent curves, we can make the distance somewhat shorter or longer, and in this way we can fix a point 27 for each curve as many as possible.

Last of all, I explain the assembling process of the pieces of the thin plate having curved frames on their edges on one side.

We must cut the bromide paper together with the thin plate by a saw of the band type along those lines produced by the projecting ray just coinciding with the perpendicular line I during the photographing and produce bores on the above-mentioned dots 27 by a punch or press and sever the bromide paper from the thin plate, for instance, zinc plate, and make it flat.

Furthermore, (refer to Fig. 5) we open two plates 28 hinged together at any angle, for instance 15°, and if the number of photographed curves, during one rotation, is, for instance, 456, then we pinch 19 pieces $$\left(456 \div \frac{360°}{15°}\right)$$

between the two plates in right order of their number.

We, through the above-mentioned bores 27, insert wires of circular arc having a radius of the distance between the points 26 and 27, and during the inserting process of the wires, we must put in packings between the two plates above-mentioned and pour melted paraffin or other similar substance into the space between them, and when it becomes dried up and hardened, we take the two plates off this solid body.

In this way we can assemble and bind up those bodies in each next 15°, in like manner, 30°, 45°, and harden all pieces having all curves.

From the general body produced by the above-mentioned process we can finish a proto-type according to the process of this invention by excluding paraffin in excess from the body and retouching particular part by oil clay or other.

The process for making such a proto-type is a feature of this invention, but the means of manufacturing statues in bronze, silver, or nickel by this proto-type is the same as has been known heretofore.

Namely, we make a negative pattern made of gypsum or other from the above-mentioned proto-type, next to this, a positive one, and produce another negative one and a core one made of casting sand.

We instil melted metal into this negative pattern of sand and in the event of its becoming cold and hard, we get it out of the pattern and make it whole.

This invention consists in simple steps and relates to an improvement of the manufacture of statues having much likeness to objects.

What I claim is:

1. A method of reproducing solid objects by photographic means, consisting in rotating the object about a vertical axis, projecting a narrow vertical beam of light radially upon said object towards the axis of rotation, the axis of projection of the light beam being directed horizontally at a constant acute angle to the horizontally directed axis of the photographic means whereby a series of foreshortened profiles of the object are obtained, and recording the position of the axis of rotation of the object relative to each profile, photographically converting the foreshortened profiles into undistorted profiles and making templets directly therefrom, and mounting such templets with the profiles outwardly directed in correct sequence radially relatively to the recorded axis of rotation, and filling in the spaces between such templets with plastic material.

2. A method of reproducing solid objects as claimed in claim 1, wherein the recording of the position of the axis of the object is affected photographically.

3. A method of reproducing solid objects as claimed in claim 1, wherein the recording of the position of the axis of rotation of the object is affected photographically and simultaneously with the recording of the foreshortened profiles of the object.

4. A method of reproducing solid objects as claimed in claim 1, in which, following each profile photographically corrected vertical straight lines are produced by the shadow of a wire indicating the position of the axis of rotation of the body, producing horizontal lines on the profiles, each point of intersection of the vertical lines and the horizontal lines being set off along the horizontal lines with respect to each respective profile.

5. A method of reproducing solid objects as claimed in claim 1, in which, following each profile photographically corrected vertical straight lines are produced by the shadow of a wire indicating the position of the axis of rotation of the body, producing horizontal lines on the profiles, each point of intersection of the vertical lines and the horizontal lines being set off along the horizontal lines with respect to each respective profile, inserting wires bent in circular arcs through each point of intersection so as to assemble the templets, the arc of each wire having a radius equal to the respective distance between each point of intersection and another point made during the insertion of the wires, packings being placed between two plates pinching the templets and melted paraffin or other plastic substance being poured into the space between them.

6. A method of reproducing solid objects as claimed in claim 1, in which, following each profile photographically corrected vertical straight lines are produced by the shadow of a wire indicating the position of the axis of rotation of the body, producing horizontal lines on the profiles, from each crossing point of the vertical lines and horizontal lines a point being set off any convenient distance along each horizontal line for each profile, the distance between the above-made point and each respective crossing point being as constant as possible, inserting wires bent in circular arcs through each above-made point so as to assemble the templets, the arc of each wire having a radius equal to the respective distance between each above-made point and crossing point of the vertical and horizontal lines, packings being placed between two plates pinching the templets and melted paraffin or other plastic substance being poured into the space between them.

ISAO MORIOKA.